(12) United States Patent  (10) Patent No.: US 8,589,509 B2
Hickey et al.  (45) Date of Patent: Nov. 19, 2013

(54) CONTROLLING AND OPTIMIZING SYSTEM LATENCY

(75) Inventors: John Hickey, Ratoath (IE); Jerome Nolan, Dublin (IE); Peter Shelley, Ballykeeffe (IE)

(73) Assignee: Cloudium Systems Limited, Limerick (IE)

( * ) Notice: Subject to any disclaimer, the term of this patent is extended or adjusted under 35 U.S.C. 154(b) by 172 days.

(21) Appl. No.: 12/984,697

(22) Filed: Jan. 5, 2011

(65) Prior Publication Data

US 2012/0173662 A1 Jul. 5, 2012

(51) Int. Cl.
*G06F 15/16* (2006.01)

(52) U.S. Cl.
USPC .............. 709/217; 709/227; 725/31; 725/32; 725/110; 380/200

(58) Field of Classification Search
USPC .............. 709/217, 227; 725/32, 31, 110, 217; 380/200
See application file for complete search history.

(56) References Cited

U.S. PATENT DOCUMENTS

| | | | |
|---|---|---|---|
| 5,809,321 A | 9/1998 | Hansen et al. | |
| 5,822,603 A | 10/1998 | Hansen et al. | |
| 5,995,490 A * | 11/1999 | Shaffer et al. | 370/260 |
| 6,157,935 A | 12/2000 | Tran et al. | |
| 6,202,060 B1 | 3/2001 | Tran | |
| 6,275,867 B1 | 8/2001 | Bendert et al. | |
| 6,400,996 B1 | 6/2002 | Hoffberg et al. | |
| 6,418,424 B1 | 7/2002 | Hoffberg et al. | |
| 6,470,380 B1 | 10/2002 | Yoshizawa et al. | |
| 6,842,433 B2 | 1/2005 | West et al. | |
| 6,845,230 B2 | 1/2005 | Syed | |
| 7,020,697 B1 | 3/2006 | Goodman et al. | |
| 7,047,196 B2 | 5/2006 | Calderone et al. | |
| 7,068,680 B1 | 6/2006 | Kaltenmark et al. | |
| 7,072,975 B2 | 7/2006 | Kato | |
| 7,096,137 B2 | 8/2006 | Shipton et al. | |
| 7,171,323 B2 | 1/2007 | Shipton et al. | |
| 7,181,572 B2 | 2/2007 | Walmsley | |
| 7,259,758 B2 | 8/2007 | Yee | |
| 7,467,198 B2 | 12/2008 | Goodman et al. | |
| 7,505,966 B2 | 3/2009 | Kato | |
| 7,516,255 B1 | 4/2009 | Hobbs | |

(Continued)

FOREIGN PATENT DOCUMENTS

EP 1788773 A1 5/2007

OTHER PUBLICATIONS

International Search Report and Written Opinion in PCT/IB2012/000741, mailed Jul. 25, 2012.

(Continued)

*Primary Examiner* — Hadi Armouche
*Assistant Examiner* — Sharif Ullah
(74) *Attorney, Agent, or Firm* — Brown Rudnick LLP (57) ABSTRACT

Systems and methods of controlling and optimizing system latency in order to minimize system latency between remotely operating computing devices over a communications network are disclosed. A method of controlling and optimizing latency over a computer network from a first computing device to a second computing device includes identifying a condition associated with the transmission of a video signal, receiving the video signal at a computing device, determining whether the condition is met after receiving the video signal, and displaying the video signal on a display device when the condition is met.

11 Claims, 4 Drawing Sheets

(56) References Cited

U.S. PATENT DOCUMENTS

| | | | |
|---|---|---|---|
| 7,523,111 B2 | 4/2009 | Walmsley | |
| 7,701,915 B2* | 4/2010 | Curcio et al. | 370/341 |
| 2001/0026319 A1* | 10/2001 | Honey et al. | 348/169 |
| 2002/0186660 A1* | 12/2002 | Bahadiroglu | 370/248 |
| 2003/0033352 A1 | 2/2003 | Stringham | |
| 2004/0170182 A1* | 9/2004 | Higashida et al. | 370/401 |
| 2005/0165617 A1 | 7/2005 | Patterson et al. | |
| 2007/0009029 A1* | 1/2007 | Craig et al. | 375/240.12 |
| 2007/0217623 A1* | 9/2007 | Harada | 381/94.1 |
| 2007/0247470 A1* | 10/2007 | Dhuey et al. | 345/545 |
| 2008/0303946 A1* | 12/2008 | Cox et al. | 348/552 |
| 2009/0220002 A1* | 9/2009 | Laan et al. | 375/240.13 |
| 2010/0014777 A1* | 1/2010 | Bruton et al. | 382/275 |
| 2010/0073574 A1* | 3/2010 | Nakajima et al. | 348/723 |
| 2011/0043512 A1* | 2/2011 | Ooga | 345/212 |
| 2011/0222556 A1* | 9/2011 | Shefler et al. | 370/465 |
| 2011/0249077 A1* | 10/2011 | Abuan et al. | 348/14.02 |

OTHER PUBLICATIONS

Remote Desktop Protocol: Basic Connectivity and Graphics Remoting Specification, Microsoft Corporation, Nov. 12, 2010 (417 pages).
International Search Report and Written Opinion in PCT/IB2011/003277, mailed Apr. 26, 2012, 9 pages.

* cited by examiner

CONTROLLING AND OPTIMIZING SYSTEM LATENCY

TECHNICAL FIELD

The invention relates to controlling and optimizing system latency, and more particularly, to minimizing system latency between a server computer and a client computer.

BACKGROUND INFORMATION

In the past, time-shared computers, also known as mainframe computers, allowed a large number of users to interact concurrently with a single computer through the use of remotely located user terminals. The next wave of computing saw individual computers, also known as personal computers move onto a user's desktop. Over time, personal computers became more powerful than the centralized mainframe computers. However, over the last five to ten years, the computing industry has seen the deconstruction of personal computers into individual components of storage, processors, and user-interfaces, where each of these components is combinable in different ways. More recently, a growing trend has been to shift back to a centralized computing model with a processor and storage located in a data center, and a user interface extended out to the desktop for the user. The benefits of centralization in this model include reduced cost, increased security, reduced operational expense, increased resilience, and increased performance.

In order to meet the growing demands of a high performance environment in a centralized computing model, it is increasingly becoming critical to minimize the latency between a server system and a remote client display over an arbitrary network in order to provide an optimal user experience. This is particularly true when trying to provide an identical fidelity of experience between remote client displays and displays on local desktop computers. For example, latency and jitter in response to a user's action must be similar in both local and remote environments for a user to not perceive a difference between the two computing experiences.

Some commercially available systems are limited by the manner in which they address the issues of system latency. For example, such systems attempt to minimize latency by synchronizing video signals based only on source and destination clocks. Accordingly, these systems do not provide the functionality necessary to optimize and minimize system latency between remotely operating computing devices.

SUMMARY OF THE INVENTION

The invention relates to controlling and optimizing system latency, and more particularly, to minimizing system latency between a server computer and a client computer.

Systems and methods according to the invention provide a significant performance increase relative to existing approaches used to address system latency. This is accomplished, for example, by systems and methods according to the invention utilizing specialized and/or dedicated components and mechanisms that control and optimize the latency between the computing devices. In a particular preferred embodiment according to the invention, one or more application-specific integrated circuits (ASICs) provide all of the necessary functionality to control and optimize system latency and also to synchronize audio and video signals. While ASICs are used as a preferred hardware implementation according to the invention, it is possible to use one or more field-programmable gate arrays (FPGAs) and/or one or more other electronic components to provide all of the control, optimization, and synchronization functionality described herein.

In one aspect, the invention relates to a method of controlling and optimizing latency over a communications network from a first computing device to a second computing device. The method includes identifying at least one condition associated with the transmission of a video signal from the first computing device to the second computing device, receiving, at the second computing device, one or more video signals sent over the communications network from the first computing device, determining, at the second computing device, whether the at least one condition associated with the transmission of the video signal is met after the one or more video signals are received, and displaying, on a display device associated with the second computing device, at least one or more video signals when the at least one condition is met.

In one embodiment according to this aspect of the invention, the at least one condition can comprise a threshold for the total number of one or more video signals transmitted over the communications network. The at least one condition can also comprise a threshold for the total number of frames within the video signal. The at least one condition can also comprise a priority level for processing the video signal.

In another embodiment according to this aspect of the invention, the method can further include a queue for storing the one or more video signals. The method can also include a step of prior to displaying, processing the one or more stored video signals into a format for display on the display device. The method can also include that processing step comprises discarding the one or more stored video signals from the queue.

In another embodiment according to this aspect of the invention, the video signal can be the output of a graphics card associated with the first computing device. The graphics card can be selected from a digital video interface, a virtual graphics interface, and a high-definition multimedia interface. The video signal can also be the output of a software driver associated with the first computing device.

These and other objects, along with advantages and features of the invention, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same or similar parts throughout the different views. Also, the drawings are not necessarily to scale, emphasis instead generally being placed upon illustrating the principles of the invention.

DESCRIPTION

The invention generally relates to controlling and optimizing system latency in order to minimize system latency between a server computer and a client computer communicating over a communications network, such as the Internet.

Figure 1:
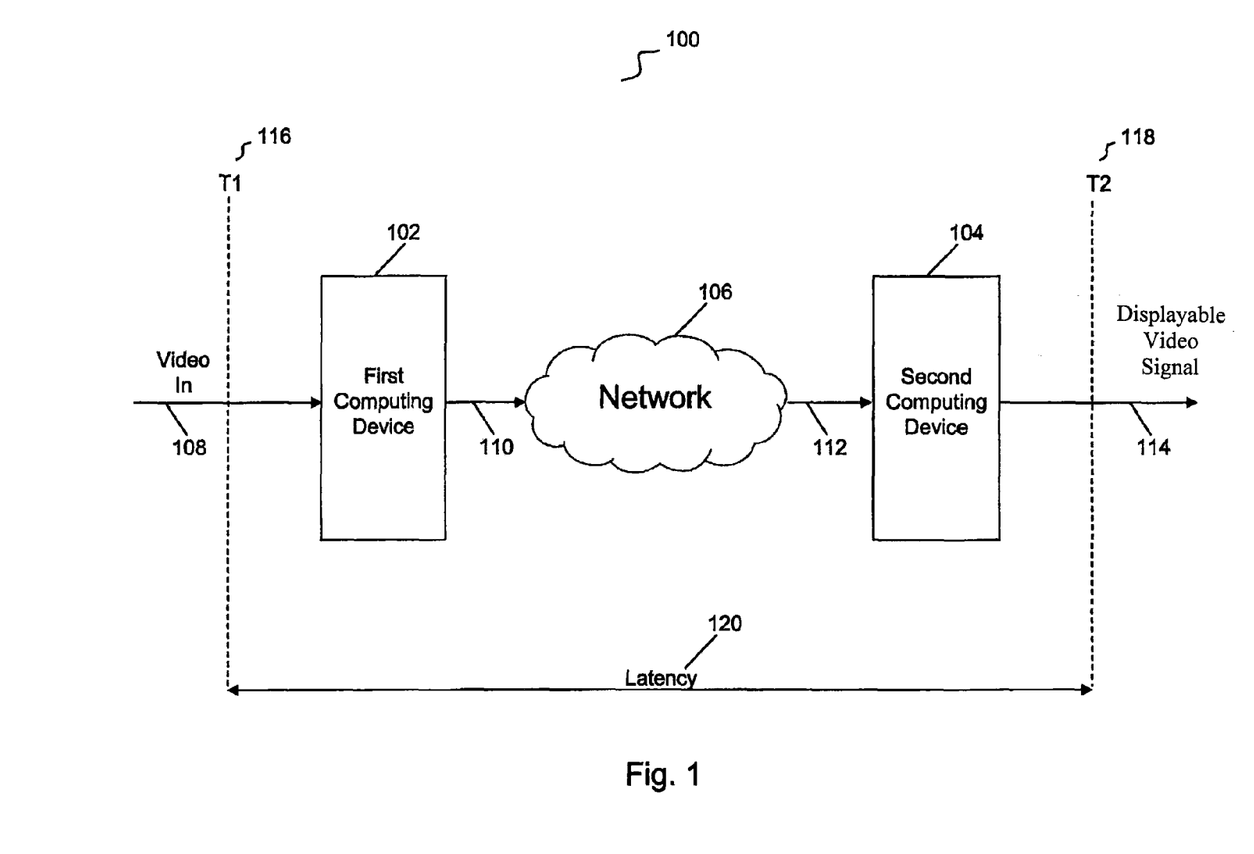
FIG. 1 is a block diagram of a system with a first computing device and a second computing device for transmitting and processing a video signal over a communications network.

Referring to FIG. 1, in one embodiment according to the invention, a system 100 includes a first computing device 102, a second computing device 104, and a communications network 106.

The first computing device 102 is located on one end of the communications network 106 and includes components (not shown in figure) for processing a video signal 108. The video signal 108 can be the output of a graphics card (e.g., Digital Video Interface (DVI), Virtual Graphics Interface (VGI), and High-Definition Multimedia Interface (HDMI)) or a software driver. The first computing device 102 is connected to the communications network 106 via a connection 110. The processed video signal 108 is sent over the communications network 106 from the first computing device 102 to the second computing device 104. The second computing device 104 is connected to the communications network 106 via a connection 112. The second computing device 104 is located on the other end of the communications network 106 and includes components (not shown in figure) for analyzing and formatting the processed video signal 108 into a displayable video signal 114. The displayable video signal 114 is displayed on a display device associated with the second computing device 104.

In order to provide the maximum user experience across the system 100, the system 100 is optimized to minimize the delay of the transmission of the video signal 108 at time period one 116 to the output of the displayable video signal 114 at time period two 118. The delay is calculated by taking the difference between time period two 118 and time period one 116. This delay is known as the latency 120 across the system 100.

Each of the connection 110 and the connection 112 can be an Ethernet cable. In other embodiments, each of the connection 110 and the connection 112 can be a coaxial or fiber optic cable. In yet other embodiments, each of the connection 110 and the connection 112 can be a wireless link or connection such as, for example, a cellular link or a Wi-Fi link. The communications network 106 can be, for example the Internet, a dedicated communications network, an intranet, a cellular network, or any other network capable of effecting communication between the first computing device 102 and the second computing device 104.

Figure 2:
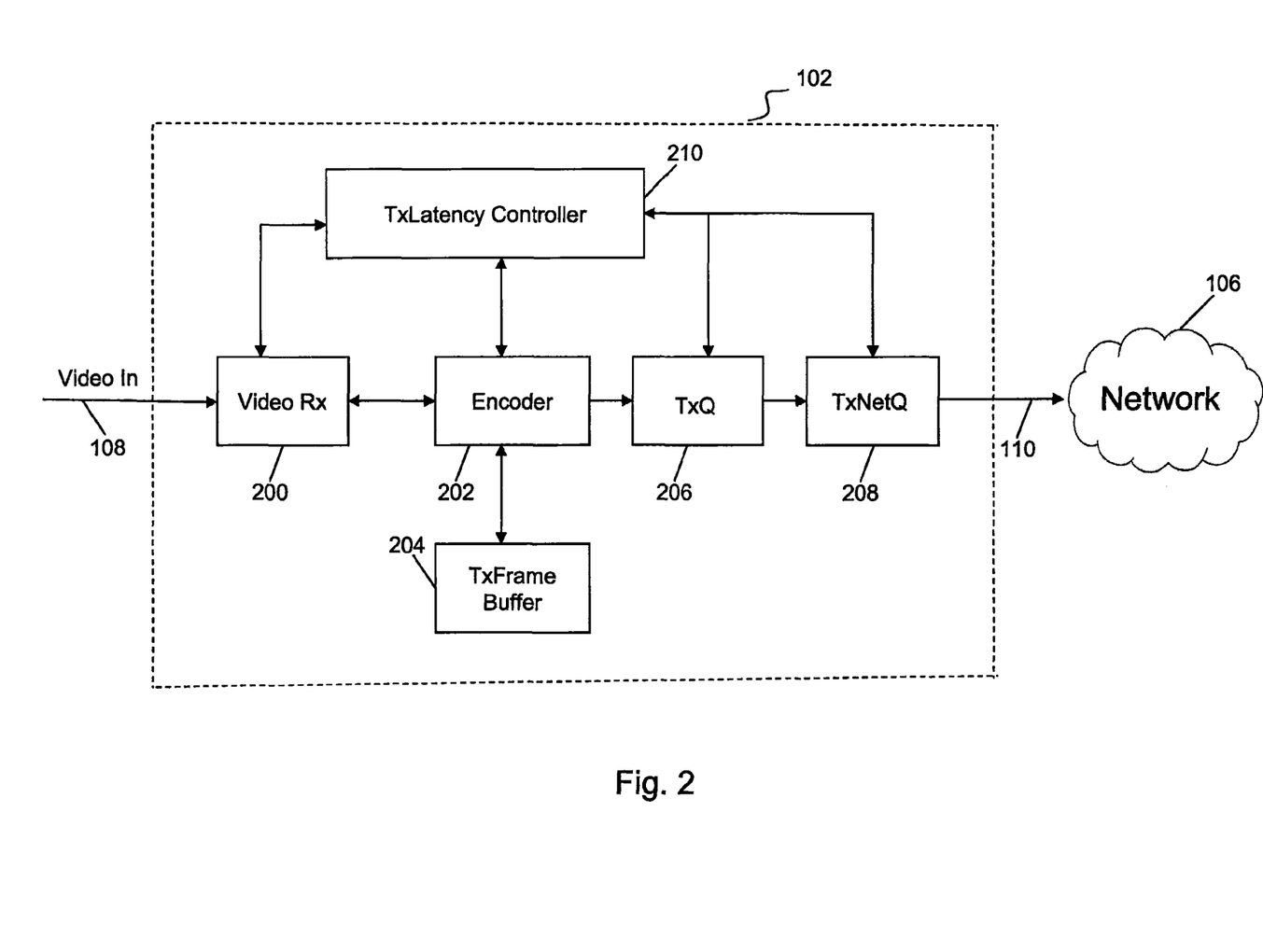
FIG. 2 is a block diagram of various components of the first computing device of FIG. 1 in communication with the communications network.

The components that are included in the first computing device 102 for processing the video signal 108, and that are not shown in FIG. 1, are shown in FIG. 2. Those components are a Video Rx 200, an Encoder 202, a TxFrame Buffer 204, a TxQ 206, a TxNetQ 208, and a TxLatency Controller 210. In a particular preferred embodiment according to the invention, the components and their functionality are realized in hardware such as by one or more application-specific integrated circuits (ASICs) that provide all of the herein-described functionality. While ASICs are used as a preferred hardware implementation according to the invention, it is possible to use one or more field-programmable gate arrays (FPGAs) and/or one or more other electronic components to provide the control, optimization, and synchronization functionality described herein for components 200, 202, 204, 206, 208, 210.

The components 200, 202, 204, 206, 208, 210 can together form a single module or card disposed within or otherwise made part of a larger system such as a server computer from which the video signal 108 comes. That server computer would include the typical parts of a server computer including at least one microprocessor, storage, and one or more input/output devices, and the server computer also would include the components 200, 202, 204, 206, 208, 210. These components could alternatively, and as shown in FIG. 2, together form a single module or card or other type of electronic hardware system that is a separate stand-alone device that receives the video signal 108 and processes it as herein-described and then sends it out to the network 106 via the connection 110.

Referring to FIG. 2, the video signal 108 is received by the Video Rx 200. Video Rx 200 formats the video signal 108 such that it can be processed by the encoder 202. The encoder 202 processes the formatted video signal 108 into frames. The frames can be categorized into two categories, namely frames that are received from the Video Rx 200 and frames that were previously received by Video Rx 200. The frames can be formatted into tiles that are arranged in various dimensions, such as 8×8, 16×16, 64×64, and 128×128.

The encoder 202 utilizes an algorithm to compress the tiles. Each tile is profiled to determine the type of data included in the formatted video signal 108. The algorithm is optimized to compress each tile based on the desired end-user experience.

The encoder 202 stores the formatted video signal 108 in either the TxFrame Buffer 204 or the TxQ 206. The TxFrame Buffer 204 is used to store the video signal 108 when it is not compressed by the encoder 202. Alternatively, the TxQ 206 is used to store the video signal 108 when it is compressed into a tile by the encoder 202. The total amount of video signals stored in either the TxFrame Buffer 204 or the TxQ 206 is dependent upon the optimization of the algorithm used by the encoder 202.

The TxQ 206 is configured to create a queue of the tiles (compressed video signal 108) as provided by the encoder 202. The TxQ 206 transfers each tile from the queue to the TxNetQ 208. The TxNetQ 208 converts each tile into packets of data for transmission across the communications network 106. These packets of data are queued for transmission over the communications network 106. The packets of data are transmitted from the TxNetQ 208 to the communications network 106 via the connection 110.

The TxLatency Controller 210 is in communication with the Video Rx 200, the Encoder 202, the TxQ 206, and the TxNetQ 208. The TxLatency Controller 210 may be used to optimize the latency within the first computing device 102. The TxLatency Controller 210 is configured to utilize lossy compression and lossless compression. For example, the TxLatency Controller 210 can perform lossy compression by instructing the Video Rx 200 or the TxQ 206 to discard frames. The TxLatency Controller 210 can also perform lossless compression by instructing the encoder 202 to increase or decrease the optimization of the algorithm in order to control the compression of each tile. The TxLatency Controller 210 can also specify a Quality-of-Service (QOS) setting on each tile prior to the conversion of the tiles into packets of data.

Figure 3:
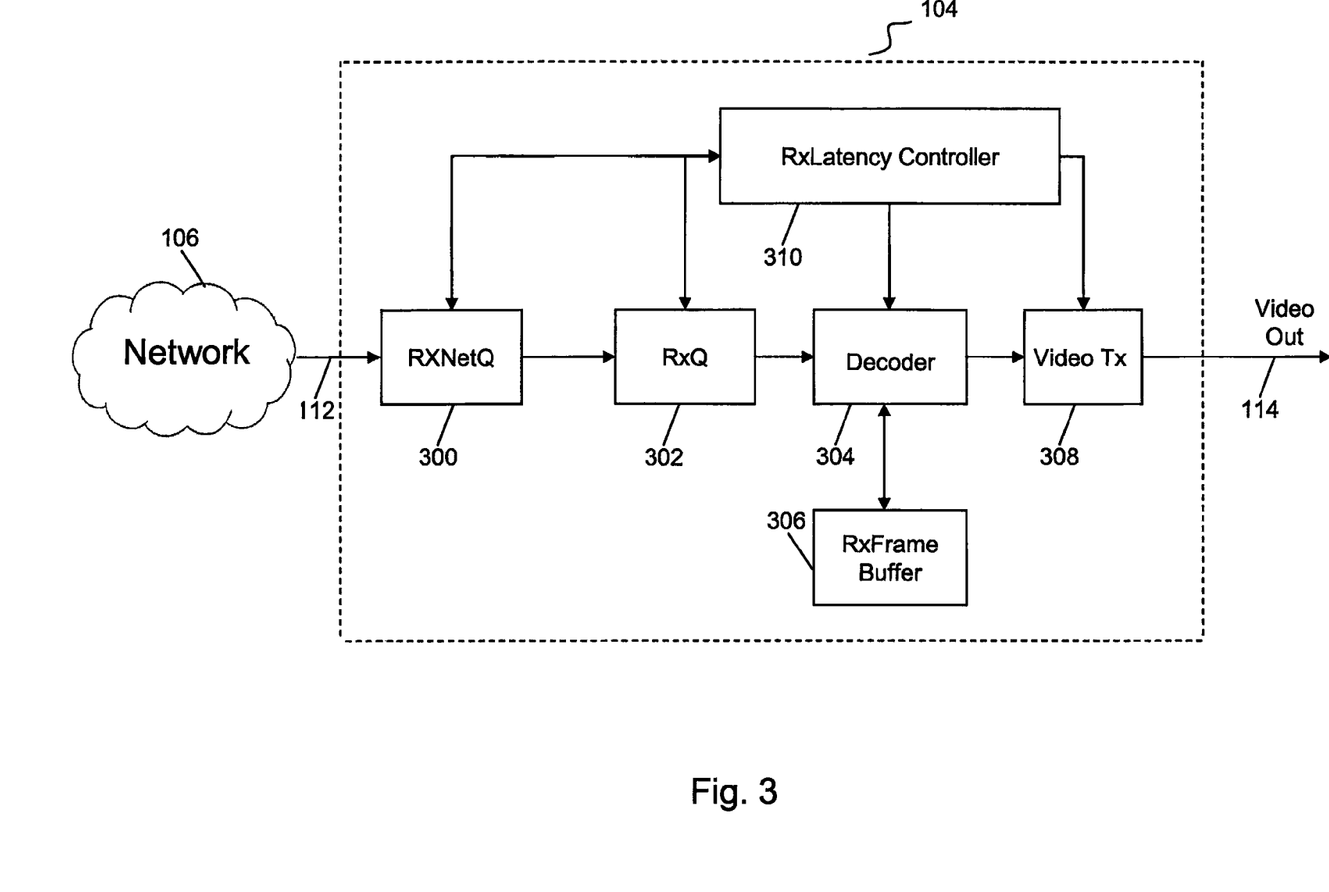
FIG. 3 is a block diagram of various components of the second computing device of FIG. 1 in communication with the communications network.

The components that are included in the second computing device 104 for analyzing and formatting the processed video signal 108 into a displayable video signal 114, and that are not shown in FIG. 1, are shown in FIG. 3. Those components are an RxNetQ 300, an RxQ 302, a Decoder 304, an RxFrame Buffer 306, a Video Tx 308, and an RxLatency Controller 310. In a particular preferred embodiment according to the invention, these components and their functionality are realized in hardware such as by one or more application-specific integrated circuits (ASICs) that provide all of the herein-described functionality. While ASICs are used as a preferred hardware implementation according to the invention, it is possible to use one or more field-programmable gate arrays (FPGAs) and/or one or more other electronic components to provide the control, optimization, and synchronization functionality described herein for components 300, 302, 304, 306, 308, 310.

The components 300, 302, 304, 306, 308, 310 can together form a single module or card disposed within or otherwise made part of a larger system such as a client computer (with a display device) to which the displayable video signal 114 goes. That client computer would include the typical parts of a client computer including at least one microprocessor, storage, and one or more input/output devices, and the client computer also would include the components 300, 302, 304, 306, 308, 310. These components could alternatively, and as shown in FIG. 3, together form a single module or card or other type electronic hardware system that is a separate stand-alone device that receives the processed video signal 108 from the connection 112 and analyzes/formats it as hereindescribed and then sends out the displayable video signal 114 to a display device so the signal 114 can be displayed on that display device. The display device could be a flat screen display or some other type of physical video display unit. The display device could be connected directly to the second computing device 104, or it could be connected to the separate client computer which receives the displayable video signal 114 from the second computing device 104.

Referring to FIG. 3, the second computing device 104 receives via the connection 112 packets of data transmitted from the first computing device 102 over the network 106. These packets of data are received by the RxNetQ 300. The RxNetQ 300 transfers the packets of data to the RxQ 302. The RxQ 302 creates a queue for each packet of data provided by the RxNetQ 300. The RxQ 302 subsequently transfers each packet of data from the queue to the decoder 304.

The decoder 304 includes an algorithm for decompressing and decoded each packet of data into a frame. The decoder 304 subsequently transfers the frame to the RxFrame Buffer 306. The RxFrame Buffer 306 can store any number frames. The frames can be categorized into two categories, namely the frames converted for display on the display device associated with the second computing device 104 and the frame being decoded by the decoder 304. The Video Tx 308 takes the frame from the RxFrame Buffer 306 and converts the frame into a display video signal 114 for display on the display device.

The RxLatency Controller 310 is used to control the latency within the second computing device 104. The RxLatency Controller 310 is in communication with the RxNetQ 300, the RxQ 302, the decoder 304, and the Video Tx 308. The RxLatency Controller 310 is configured to utilize lossy compression and lossless compression. For example, the RxLatency Controller 310 can perform lossy compression by instructing the RxQ 302 or the decoder 304 to discard frames. The RxLatency Controller 310 can also perform lossless compression by instructing the Video Tx 308 to prepare a frame for display on the display device.

Figure 4:
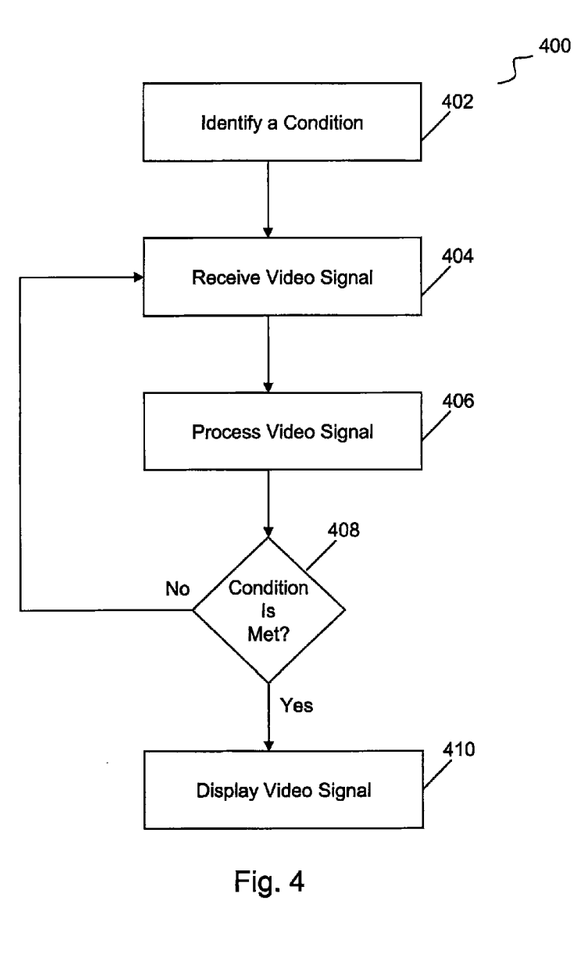
FIG. 4 is a flow chart of controlling and optimizing latency over a communications network from a first computing device to a second computing device.

Referring to FIGS. 3 and 4, a method 400 can be used to control and optimize latency over the communications network 106. The method 400 includes the following steps: identifying a condition 402, receiving a video signal 404, processing the video signal 406, determine whether the condition is met 408, and displaying the video signal 410. In operation, the system 100 is configured to identify at least one condition with the transmission of the video signal 108 from the first computing device 102 to the second computing device 104 at step 402. In response to identifying the condition, the video signal 108 is transmitted from the first computing device 102 to the second computing device 104. The video signal 108 is received by the second computing device 104 at step 404. Upon receiving the video signal 108, the system 100 determines whether the at least one condition associated with the transmission of the video signal 108 is met at step 406. If the condition is met, the video signal 108 is converted into a displayable video signal 114 at step 408. If the condition is not met, the video signal 108 is not provided for display on the display device associated with the second computing device 104. The displayable video signal 114 is subsequently displayed on the display device.

RxLatency Controller 310 can include at least four types of mechanisms for controlling latency. Each of these types of mechanisms is associated with a condition as identified at step 402 of the method 400.

Rx Cut-Through (RxCT) is one type of mechanism used to control latency within the second computing device 104. RxCT can be a programmable threshold that defines when to begin displaying the displayable video signal 114 on the display device associated with the second computing device 104. In operation, the system 100 is configured to identify this programmable threshold as a condition at step 402 of the method 400. This condition may be defined in terms of total number of pixels, total number of lines, or a percentage of the total number of frames within the video signal 116. Once this condition is met (e.g., the total number of frame is exceeded), the Video Tx 308 displays the video signal 114 on the display device.

The programmable threshold is typically initialized to cover twice the amount of standard network jitter to minimize the potential for an under-run in the transmission of the video signal 108. For example, due to latency across the system 100, the decompressed frame (video signal 108) may not be stored in the RxFrame Buffer 306. As a result, the Video Tx 308 is unable to display the decompressed frame in its entirety on the display device 128. This is known as video tearing. Therefore, in operation, the Video Tx 308 checks whether the programmable threshold is exceeded prior to retrieving a frame from the RxFrame Buffer 306. If the threshold is exceeded, then a sufficient amount of the frame is stored in the RxFrame Buffer 306 and the Video Tx 308 may begin to convert and display the frame on the display device. In a normal steady state, this will function as the normal mode of operation.

The system 100 can also move out of the steady-state mode of operation when there is a change in latency and jitter in the communications network 106 or other events such as a major change in compressions ratio used by the first computing device 102 or the second computing device 104. For example, the Video Tx 308 can determine whether the programmable threshold has not been met. In one instance, if the Video Tx 308 determines that the programmable threshold has not been met, the Video Tx 308 will replay the previously displayed video signal 114 on the display device associated with the second computing device 104. In another instance, if the RxFrame Buffer 306 does not include any frames, this means that the network jitter has likely exceed the programmable threshold.

After one of these two events, the programmable threshold can be increased to allow for an increase in jitter across the communications network 106. Various algorithms can be used to optimize this programmable threshold. For example, the programmable threshold can be increased by a specified value or it can be adjusted by an estimated increase in jitter across the communications network 106. This adjustment can be estimated by the amount that the programmable threshold was not exceeded. The programmable threshold can also be tuned by running a probability function on the number of frames stored in the RxFrame Buffer 306 when the Video Tx 308 looks to start retrieve the frame for display on the display device associated with the second computing device 104. This result can be defined as RxBuffSiz. The dynamic tuning of the programmable threshold is important to allow for tuning to changes in latency and jitter across the communications network 106.

The following is an example of a typical algorithm that can be used to optimize the programmable threshold:
1. The RxCT programmable threshold is initialized to account for the estimated jitter across the communications network 106.
2. Video Tx 308 begins displaying the displayable video signal 114 on the display device associated with the second computing device 104.
3. Now utilize the following formula: RxCTnew=RxCT programmable threshold+(RxCT programmable threshold−RxBuffSiz)/N (where N is any non-integer number, typically ~32)
4. If (RxCTnew<RxCTmin), then the RxCT programmable threshold=RxCTmin; else if (RxCTnew>RxCTmax) then RxCT=RxCTmax; else RxCT=RxCTnew
5. If an under-run occurs, the RxCT programmable threshold can be set to equal the RxCTmax.
6. Return to step 2.

The RxCTmin can be a user-defined minimum value for the RxCT programmable threshold (e.g., 1/32 of a frame or 5 lines of a frame.) This can be translated based on the video resolution used by the display device associated with the second computing device 104. The RxCTmax can also be a user defined maximum value for the RxCT programmable threshold.

In the event that an under-run occurs, an algorithm may be used to ensure that the frame retrieved for display by Video Tx 308 has been fully decoded. By setting the RxCT programmable threshold to the RxCTmax as shown in step 5, a less aggressive reaction of a tear event can occur. Many different algorithms can also be used to tune the RxCT programmable threshold.

A secondary use of tuning the RxCT programmable threshold is to allow for the tuning of the display timing of Video Tx 308. The display timing of Video Tx 308 can be setup to match the timing on Video Rx 200 of the first computing device 102. Due to clock drifts and slight variations in timing, the display time of Video Tx 308 can be slightly different than the timing of Video Rx 200, which will cause an under-run or over-run in the transmission of the video signal 108 (e.g., the first computing device 102 can send data faster or slower than the second computing device 104 can display). A comparison can be performed on each transmitted video signal 108 to add an extra clock to the display timing if Video Tx 308 detects that the average rate of decompressing frames into the RxFrame Buffer 306 is slower than the rate of displaying them. Changes to the display timing can take place slowly over a long period of time (10s to 1000s of seconds) to avoid the jittery display of the displayable video signal 114. This comparison can also ensure that low-level transients across the communications network 106 are not picked up, essentially debouncing changes when a programmable number changes are seen in succession. This debouncing performs as a smoothing and/or hysteresis function to ensure the resulting displayed images do not jitter due to constant tuning. Various algorithms can be used for to account for de-bouncing, such as only allowing a change of 'X' clocks periods in a period of 'Y' frames. In this way, the Video Tx 308 can self tune itself to the timings of Video Tx 308 in a way that minimizes latency. In essence, the tuning of display timings seeks to keep the RxCT programmable threshold as low as possible. An example algorithm is shown below:

The following is an example of a typical algorithm that can be used to tune the display timing of the Video Tx 208:
1. VSyncClocks is initialized. This is typically set to a minimum valid value of VSyncPeriod based on video standards.
2. Wait unit RxCT programmable threshold is calculated.
3. Now utilize $VSyncClocks_{new}$=VSyncClocks+VSyncClocks*(RxCT programmable threshold−RxBuffSiz)/B (where B is any non-zero positive integer number, typically ~2048)
4. If ($VSyncClocks_{new}$<$VSyncClocks_{min}$) then VSyncClocks=$VSyncClocks_{min}$; else if ($VSyncClocks_{new}$>$VSyncClocks_{max}$) then VSyncClocks=$VSyncClocks_{max}$; else VSyncClocks=$VSyncClocks_{new}$;
5. Return step 2.

The $VSyncClocks_{min}$ can be a user defined minimum value for VSyncClocks. The $VSyncClocks_{max}$ can be a user defined maximum value for VSyncClocks. The VSyncClocks can be a non-zero integer value.

If there is a build-up of more than a couple of frames, it is also possible to drop frames at the first computing device 102 and the second computing device 104 in order to reduce the overall latency. In this instance, audio signals would typically not be dropped at the first computing device 102 as it normally is much less data to transfer across the communications network 106 in contrast to video signals. Therefore, audio signals would only be dropped at the second computing device 104 only if necessary, such as the audio and video signals are misaligned.

Receive/Discard is another type of mechanism used to control latency within the second computing device 104. Receive/Discard can be also be a programmable threshold that defines when to begin displaying a displayable video signal 114 on the display device associated with the second computing device 104. In operation, system 100 is configured to identify the programmable threshold as a condition. Once this condition is met, the Video Tx 308 can either skip or discard the frame stored in the RxFrame Buffer 306 or simply replay the last displayable video signal 114 displayed on the display device. This functionality allows the second computing device 104 to catch up by dropping a frame without that frame being visible to an end-user.

Transmit/Discard is another type of mechanism used to control latency within the first computing device 102 and the second computing device 104. Transmit/Discard can be a programmable threshold that defines a total number of frames within the video signal 108. Ideally, this threshold should be less than one when operating in a low latency communications network 106. In contrast, on a high latency communications network 106, the threshold can be set to a few frames. For example, if the latency over the communications network 106 is 50 milliseconds (ms) and the video signal 108 is 16 milliseconds (ms), the programmable threshold could be set to three or four frames.

Sometimes jitter in the communications network 106 can cause the video signal 108 to be buffered in the TxQ 206 in the first computing device 102. This jitter can be due to changes on the communications network 106, thereby causing less or more bandwidth to be available or lower rates of compression causing the available network bandwidth to be exceeded.

The TxQ 206 keeps a count of the number of frames in the video signal 108. This value can be known as TxQSiz. In operation, the first computing device 102 receives periodic updates from the second computing device 104 of which frame it is currently displaying. This value can be known as RxCurFr. The TxLatencyController 210 uses these two pieces of information, TxQSiz and RxCurFr, together with the current frame being received, also known as TxCurFr, to estimate the total number of frames in transit. This is designated as TxLatency.

If the TxLatency exceeds MaxTxLaceny, the oldest frame in the TxQ 206 is discarded. The MaxTxLatency can be a set value or can be dynamically estimated by round-trip from the first computing device 102 to the second computing device 104. This allows for tuning the amount of frames in the TxQ 206 to specific conditions of the communications network 106.

Compression/NetworkQ is another type of mechanism used to control latency within the first computing device 102 and the second computing device 104. Compression/NetworkQ can be a priority level for processing the video signal 108 that is transmitted between the first computing device 102 and the second computing device 104. Compression/NetworkQ is typically used with the encoder 202 of the first computing device 102 and it utilizes a combination of compression techniques to process the video signal 108 to optimize compression while minimizing visual defects. In operation, the system 100 is configured to identify the priority level as a condition. Once this condition is met, the video signal 108 is converted into packets of data for transfer over the communications network 106 based on its priority level. For example, audio signals can be set to the highest priority followed by video signals. This ensures that latency sensitive data does not get queued behind non-latency sensitive traffic for transmission over the communications network 106. Additionally, to ensure low latency, the encoder 202 can process a frame in real-time. The encoder 202 can also perform temporal as well as spatial compression using real-time techniques.

The system 100 can also be used for audio and video synchronization. For example, the encoder 202 can time stamp incoming audio signals prior to transmission to the second computing device 102. Upon receipt by the second computing device 104, the decoder 304 stamps the incoming audio signals to indicate the time of receipt. The first and second timestamps of the audio signal can be compared to determine whether any adjustments should be made to synchronize the audio signal with the video signal in order to maintain lip-sync between the audio and video.

Additionally, the encoder 202 and the decoder 304 can be tuned to replay and/or drop frames in order to allow synchronization between the audio signal and the video signal. A key aspect of this algorithm is to ensure that the damping factors allows the this tuning to be performed in a manner that a user cannot visually or audibly notice changes during normal network conditions, and gracefully handle abnormal conditions. For example, a 32-bit timer value could give a +/−14 second window for video at high definition resolutions (1920×1200), which is more than adequate for any difference that should arise between the audio and video synchronization.

A sub one-second delay can be expected in this configuration unless there are network connectivity issues. It is also expected that the difference between the audio and video synchronization can be due to network effects between the first computing device 102 and the second computing device 104. Therefore, in this configuration, video frames will not unnecessarily be dropped due to a lack of synchronization with the audio signal.

In cases where audio and video synchronization is critical, such as the broadcast industry with audio and video post production, it is possible to align the audio and video signals at the first computing device 102 prior to transmission to the second computing device 104. Alternately, audio signals can be introduced into the packets of data prior to transmission from the first computing device 102 to the second computing device 104. Because both audio and video signals are being sent over the same network connection, this arrangement will remove latency differences that may occur at the computer server or across the communications network 106.

In a particular preferred embodiment according to the invention, each of the first and second computing devices 102, 104 is realized in hardware such as with one or more application-specific integrated circuits (ASICs). That is, for all of the functionality described herein for the first computing device 102, one or more ASICs can provide all of that functionality, and, for all of the functionality described herein for the second computing device 104, one or more ASICs can provide all of that functionality. While one or more ASICs are used as the preferred hardware implementation according to the invention, it is possible to use one or more field-programmable gate arrays (FPGAs) and/or one or more other electronic components. Each ASIC, FPGA, and other component can include one or more processors (such as 32-bit processors), storage such as memory (including ROM, RAM, EEPROM, Flash), and other large electronic building blocks, and as is typical a hardware description language (HDL) such as Verilog or VHDL can be used by the designer(s) of the ASICs or other components to describe the functionality of the ASICs or other components.

It is noted that each of the TxLatency Controller 210 and the RxLatency Controller 310 can include embedded software or otherwise have software support to control hardware functionality, particularly when longer-term averages are being computed.

Also, whether or not the components 200, 202, 204, 206, 208, 210 (that together constitute the herein-described video signal transmitter functionality) are disposed within or otherwise made part of a server computer, and whether or not the components 300, 302, 304, 306, 308, 310 (that together constitute the herein-described video signal receiver functionality) are disposed within or otherwise made part of a client computer, each of these server and client computers typically will include at least one processor such as a microprocessor, storage, and one or more input/output devices. The storage can contain software code or instructions which, when executed by the processor(s), causes the processor(s) to perform a variety of functions. The storage is one or more of any kind of physical computer-readable media such as magnetic storage media (e.g., hard disks, floppy disks, and magnetic tape), optical storage media (e.g., compact discs or CDs, digital video discs or DVDs, compact disc read only memories or CD-ROMs), magneto-optical storage media, read-only memory or ROM, random-access memory or RAM, and flash memory devices. The input/output devices can include a keyboard, a mouse or other pointing device, a display, etc.

It will be understood that various modifications may be made to the embodiments disclosed herein. Therefore, the above description should not be construed as limiting, but merely as illustrative of embodiments according to the invention.

What is claimed is:

1. A method of controlling and optimizing latency over a communications network from a first computing device to a second computing device comprising:

establishing a threshold identifying at least one condition associated with the transmission of a video signal comprising a plurality of frames from the first computing device to the second computing device, the threshold based on a number of the plurality of frames in transit between the first and second computing devices that cause latency;

receiving, at the second computing device, one or more of the plurality of frames sent over the communications network from the first computing device;

measuring a first number of frames of the plurality of frames on the first computing device;

identifying which frame of the plurality of frames is currently being received by the second computing device;

identifying which frame of the plurality of frames is currently being displayed on a display device associated with the second computing device;

associating the first number of frames, the currently received fame, and the currently displayed frame to determine an actual number of frames in transit;

determining whether the actual number of frames in transit exceeds the threshold; and discarding an outdated frame on the first computing device, to minimize the effects of the latency when the actual number of frames in transit exceeds the threshold.

2. The method of claim 1 wherein the first number of frames comprises a total number of the plurality of frames.

3. The method of claim 1 wherein the video signal is the output of a graphics card associated with the first computing device.

4. The method of claim 3 wherein the graphics card is selected from a digital video interface, a virtual graphics interface, and a high-definition multimedia interface.

5. The method of claim 1 wherein the video signal is the output of a software driver associated with the first computing device.

6. The method of claim 1 wherein the outdated frame is the oldest frame.

7. The method of claim 1 further comprising a queue for storing the one or more of the plurality of frames.

8. The method of claim 7 wherein the discarded frame is one of the queued frames.

9. The method of claim 1, further comprising adjusting compression of one or more of the plurality of frames when the actual number of frames in transit exceed the threshold.

10. A method of controlling and optimizing latency over a communications network from a first computing device to a second computing device comprising:

establishing a threshold associated with the transmission of a video signal comprising a plurality of frames from the first computing device to the second computing device, the threshold based on a number of the plurality of frames in transit between the first and second computing devices that cause latency;

receiving, at the second computing device, one or more of the plurality of frames sent over the communications network from the first computing device;

identifying which frame of the plurality of frames is currently being received by the second computing device;

associating the currently received fame, a total number of the plurality of frames of the video signal, and a frame currently being displayed on the second computing device in order to determine an actual number of frames in transit between the first computing device and second computing device; and discarding one or more frames to minimize the effects of the latency when the actual number frames in transit exceeds the threshold.

11. The method of claim 10 wherein the one or more discarded frames are outdated.

* * * * *